United States Patent [19]

Schrödter et al.

[11] 4,180,471

[45] Dec. 25, 1979

[54] PRODUCTION OF BLENDS OF CRYSTALLINE ZEOLITE AND SODIUM TRIPHOSPHATE

[75] Inventors: Klaus Schrödter, Cologne; Joachim Kandler, Erfstadt; Hasso Spott, Kerpen-Balkhausen, all of Fed. Rep. of Germany

[73] Assignee: Hoechst Aktiengesellschaft, Fed. Rep. of Germany

[21] Appl. No.: 960,240

[22] Filed: Nov. 13, 1978

[30] Foreign Application Priority Data

Nov. 17, 1977 [DE] Fed. Rep. of Germany ....... 2751354

[51] Int. Cl.2 ........................ C01B 33/28; C02B 1/44; C11D 11/00; C11D 11/02

[52] U.S. Cl. .................................. 252/140; 159/4 R; 159/4 J; 252/174.25; 252/135; 252/179; 423/328

[58] Field of Search ................. 252/89, 131, 135, 140, 252/179; 23/313 R; 159/4 R, 4 J

[56] References Cited

U.S. PATENT DOCUMENTS

| | | | |
|---|---|---|---|
| 3,629,955 | 12/1971 | Davis | 159/4 CC |
| 3,684,724 | 8/1972 | Dyer | 252/135 |
| 3,770,644 | 11/1973 | Huttinger | 252/135 |
| 3,985,669 | 10/1976 | Krummel | 252/116 |
| 3,996,149 | 12/1976 | Burke | 252/131 |
| 4,019,999 | 4/1977 | Ohren | 252/140 |
| 4,083,793 | 4/1978 | Jakobi | 252/99 |
| 4,088,593 | 5/1978 | Roebke | 252/89 R |
| 4,092,261 | 5/1978 | Sperling | 252/131 |
| 4,102,977 | 7/1978 | Sugahara | 252/179 X |
| 4,129,511 | 12/1978 | Ogoshi | 252/140 |

FOREIGN PATENT DOCUMENTS

| | | | |
|---|---|---|---|
| 2529685 | 1/1976 | Fed. Rep. of Germany | 252/140 |

*Primary Examiner*—Dennis L. Albrecht

*Attorney, Agent, or Firm*—Connolly and Hutz

[57] ABSTRACT

Blends of crystalline zeolites and sodium triphosphate are made. To this end, a zeolite suspension is spray-dried jointly with an aqueous sodium orthophosphate solution or suspension, in which the molar ratio of Na to P necessary to produce zeolite-free sodium triphosphate containing Na and P in a theoretical ratio of 1.66 is reduced by decrements of 0.01% per each 10% by weight proportion of zeolite in the blend. The zeolite suspension is sprayed separately from the orthophosphate solution or suspension at a separation necessary for the resulting zeolite particles to dry superficially and for the resulting phosphate particles to undergo at least partial condensation, and the superficially dry particles are contacted with the at least partially condensed particles.

4 Claims, 1 Drawing Figure

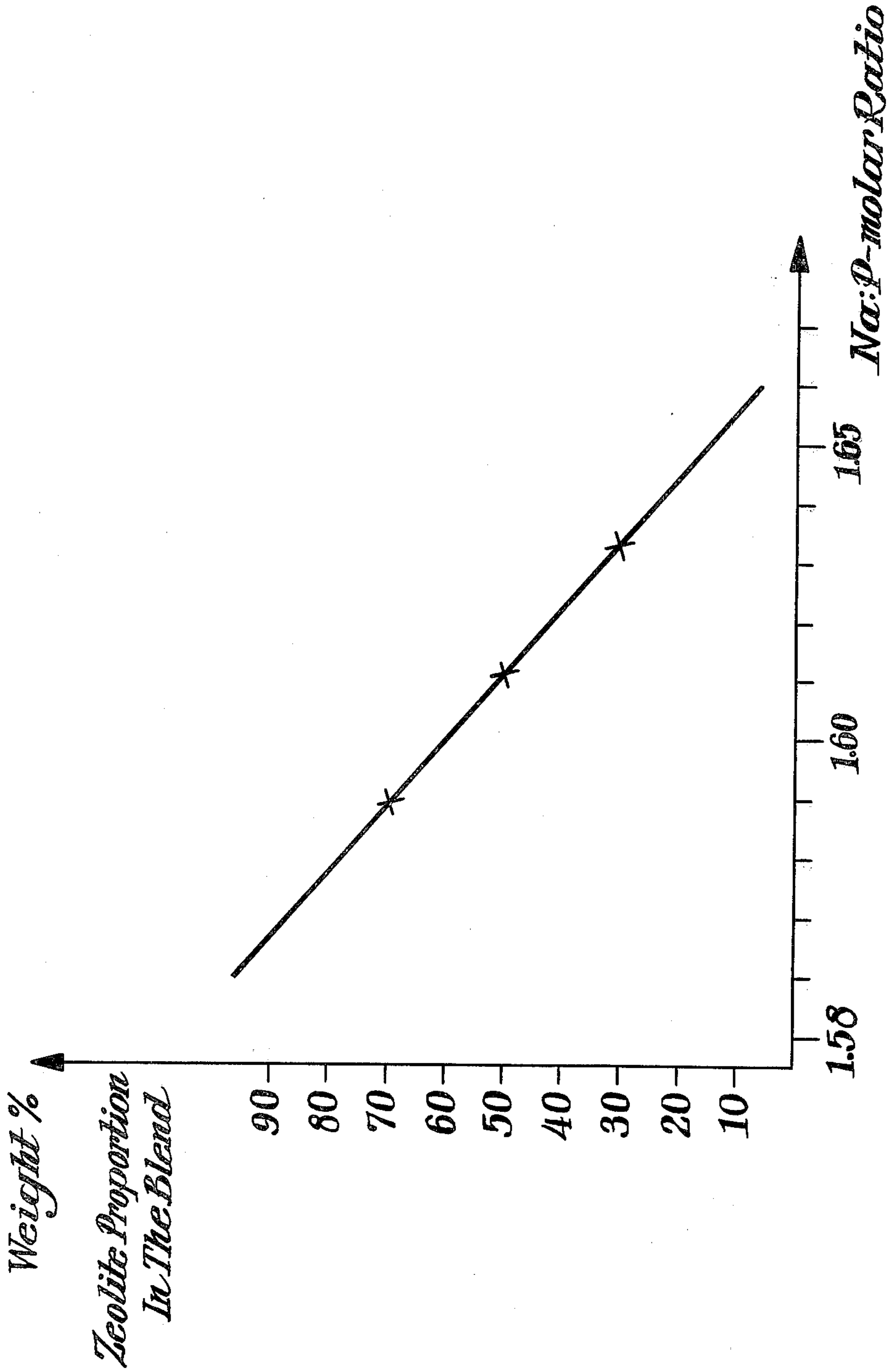
Weight %
Zeolite Proportion In The Blend
90
80
70
60
50
40
30
20
10
1.58
1.60
1.65
Na:P-molar Ratio

PRODUCTION OF BLENDS OF CRYSTALLINE ZEOLITE AND SODIUM TRIPHOSPHATE

This invention relates to a process for making blends comprising one or more crystalline zeolites and sodium triphosphate, wherein an aqueous solution or suspension of sodium orthophosphate is spray-dried together with a zeolite suspension.

Blends of this type which contain triphosphate generally in admixture with 10 to 50 weight% of one or more zeolites are most widely used as so-called builders in detergent compositions of low phosphate content.

The blends described are generally prepared as follows: The components making the blend, which are prepared separately from one another, are converted to pulverulent materials and the latter are mixed together. The triphosphate component can be produced by known methods of the kind wherein a sodium orthophosphate solution or suspension containing about 28 to 32 1 weight% of $P_2O_5$ and Na and P in a molar ratio of 1.667, is spray-dried, preferably at temperatures of 350° to 500° C.

The zeolites on the other hand are prepared by subjecting a mixture of water glass and aluminate to hydrothermal crystallization, the resulting crystallization product being separated from its mother liquor and dried in a rotating tubular structure or hot air spray-tower at temperatures within the range 100° to 350° C.

The prior art methods just described all require the two components making the builder to be prepared separately.

The builder could naturally be manufactured under commercially more attractive conditions than heretofore if it were possible to combine the technically expensive step of drying the zeolites with the preparation of the triphosphate. In German Patent Specification "Offenlegungsschrift" No. 2 529 685, which describes the production of detergent and cleaning compositions of low phosphate content, It has been suggested that the phosphate-containing aqueous detergent slurry should be spray-dried together with at least portions of pulverulent zeolite.

With a view to reducing the expenditure of machinery and effecting energy savings, it appeared reasonable to spray-dry the zeolite suspension jointly with the orthophosphate solution or suspension with the aid of a dual feed nozzle. Tests have indeed been made to this end but they failed to yield the desired product as the individual components issuing from the spray nozzle apparently underwent some kind of interaction via the aqueous phase.

This, however, has adverse effects on the condensation of the phosphate resulting in the formation of considerable proportions of diphosphate, and on the structure of the individual zeolites.

In accordance with our present invention, we now provide a process which is free from the adverse effects described hereinabove.

The process for making blends of one or more zeolites and sodium triphosphate of this invention comprises: spray-drying a zeolite suspension jointly with an aqueous sodium orthophosphate solution or suspension, in which the molar ratio of Na to P necessary to produce zeolite free sodium triphosphate containing Na and P in a theoretical molar ratio of 1.66 is reduced by decrements of 0.01% per each 10% by weight proportion of zeolite in the blend; the zeolite suspension being sprayed separately from the orthophosphate solution or suspension at a separation necessary for the resulting zeolite particles to dry superficially and for the resulting phosphate particles to undergo at least partial condensation; and contacting the superficially dry particles with the at least partially condensed particles.

Preferred features of the present invention provide:

(a) for the zeolites to comprise aluminum silicates of the general formula $(cat_{2/n}O)_x.Al_2O_3.(SiO_2)_y$, in which cat stands for a calcium-exchangeable cation with the valency n, x stands for a number of 0.7 to 1.5, and y stands for a number of 0.8 to 6;

(b) for the zeolite to be grade A zeolite; and (c) for the spray-drying to be effected at temperatures within the range 350° to 500° C.

The blends obtainable by the process of this invention combine in themselves particle fineness with flowability and storability.

By the process of the present invention, it is possible to condense sodium triphosphate without any significant formation of diphosphate, to dry the zeolite, and to mix the two components intimately with one another in a single step. In other words, the present process compares favorably with the prior art methods, in which use is made of a separate spray tower for drying the zeolite and of a mixer for preparing the zeolite-containing blend.

Also the present process enables blends of whatever composition to be made.

BRIEF DESCRIPTION OF THE DRAWING

The correlation which exists between the zeolite proportion in the blend and the Na:P-molar ratio in the orthophosphate solution or suspension is shown in the accompanying FIGURE As can be seen, the Na:P-molar ratio in the orthophosphate must be smaller than 1.66 and greater than 1.56, depending on the proportion of zeolite desired in the final blend. The following Examples illustrate the invention.

EXAMPLE 1 (Comparative Example)

140 kg/h of a sodium orthophosphate solution, which contained 20 weight% of $P_2O_5$, and Na and P in a molar ratio of 1.66 theoretically necessary for the formation of sodium triphosphate, and 175 kg/h of an aqueous 40 weight% zeolite grade A suspension were sprayed near the head of a spray tower at 410° C. through two nozzles separated from one another at a separation of 1 meter. Only when the zeolite particles were superficially dry and the phosphate particles condensed at least partially, were the two cones of sprayed material permitted to contact one another. Analyses and X-ray investigation showed that the product was a 50:50 weight% mixture of crystalline zeolite grade A and condensed phosphates. The phosphate condensation product was found to contain only 55% of triphosphate together with 45% of diphosphate (paper chromatography).

EXAMPLE 2

The procedure and conditions were as in Example 1, but a sodium orthophosphate solution which contained Na and P in a molar ratio of 1.61 was used. A crystalline reaction product was obtained which contained 50 parts by weight of zeolite grade A and 50 parts by weight of a phosphate condensation product, of which 95% was sodium triphosphate.

EXAMPLE 3 (Comparative Example)

The procedure was as in Example 2, but the sodium orthophosphate solution and zeolite suspension were sprayed into the tower through a multi feed nozzle (which replaced the two separate nozzles used in Example 2) through two separate channels so that the cones of sprayed material contacted one another immediately downstream of the nozzle. The resulting product contained 80% of sodium diphosphate and only 20% of triphosphate. Also, the product contained only 30% of zeolite grade A rather than 50% which would have been expected. The remaining 20% of silicate material was found to have been modified, but this was not investigated.

EXAMPLE 4

350 kg/h of an aqueous 40 weight% zeolite grade A suspension and 120 kg/h of a sodium orthophosphate solution with a Na:P-molar ratio of 1.59 were sprayed in the manner described in Example 2 through two nozzles disposed near the head of a spray tower. The nozzles were separated from one another at a separation of 1 meter. The gas issuing from the spray tower had a temperature of 380° C. Analyses and X-ray analysis showed that the product was a mixture containing crystalline zeolite grade A and sodium triphosphate in a ratio by weight of 70:30. 4% of the overall $P_2O_5$ in the mixture was diphosphate.

We claim:

1. A process for making blends of one or more crystalline zeolites and sodium triphosphate which comprises: spray-drying a zeolite suspension jointly with an aqueous sodium orthophosphate solution or suspension, in which the molar ratio of Na to P necessary to produce zeolite-free sodium triphosphate containing Na and P in a theoretical ratio of 1.66 is reduced by decrements of 0.01% per each 10% by weight proportion of zeolite in the blend; the zeolite suspension being sprayed separately from the orthophosphate solution or suspension at a separation necessary for the resulting zeolite particles to dry superficially and for the resulting phosphate particles to undergo at least partial condensation; and contacting the superficially dry particles with the at least partially condensed particles.

2. The process as claimed in claim 1, wherein the zeolite is an aluminum silicate of the general formula $(cat_{2/n}O)_x.Al_2O_3.(SiO_2)_y$, in which cat stands for a calcium-exchangeable cation with the valency n, x stands for a number of 0.7 to 1.5, and y stands for a number of 0.8 to 6.

3. The process as claimed in claim 1, wherein the zeolite is a grade A zeolite.

4. The process as claimed in claim 1, wherein the spray drying is effected at temperatures within the range 350° and 500° C.

* * * * *